(12) United States Patent
Kitajima

(10) Patent No.: US 6,880,776 B2
(45) Date of Patent: Apr. 19, 2005

(54) REEL UNIT FOR SPINNING REEL

(75) Inventor: Keigo Kitajima, Sakai (JP)

(73) Assignee: Shimano Inc., Osaka (JP)

( * ) Notice: Subject to any disclaimer, the term of this patent is extended or adjusted under 35 U.S.C. 154(b) by 27 days.

(21) Appl. No.: 10/651,999

(22) Filed: Sep. 2, 2003

(65) Prior Publication Data
US 2004/0079821 A1 Apr. 29, 2004

(30) Foreign Application Priority Data
Oct. 25, 2002 (JP) .......................................... 2002-311547

(51) Int. Cl.⁷ .............................................. A01K 89/01
(52) U.S. Cl. ........................ 242/310; 242/312; 411/903; 403/408.1
(58) Field of Search ............................... 242/310, 311, 242/312; 411/903; 403/408.1

(56) References Cited

U.S. PATENT DOCUMENTS

| 4,372,701 A | * | 2/1983 | Watanabe | 403/24 |
| 5,476,230 A | | 12/1995 | Yamaguchi | |
| 5,540,397 A | | 7/1996 | Yoshikawa | |
| 5,683,051 A | * | 11/1997 | Hitomi et al. | 242/311 |
| 6,050,513 A | * | 4/2000 | Benit et al. | 242/311 |
| 6,102,317 A | * | 8/2000 | Bernard et al. | 242/319 |
| 6,629,655 B1 | * | 10/2003 | Kitajima | 242/311 |
| 2002/0056776 A1 | * | 5/2002 | Sugawara | 242/231 |
| 2003/0136867 A1 | * | 7/2003 | Kitajima | 242/310 |
| 2003/0146324 A1 | * | 8/2003 | Yeh | 242/311 |
| 2003/0146325 A1 | * | 8/2003 | Kitajima | 242/311 |

FOREIGN PATENT DOCUMENTS

| DE | 4307033 A1 | 9/1993 |
| EP | 1304032 A2 | 4/2003 |

* cited by examiner

Primary Examiner—Eileen D. Lillis
Assistant Examiner—Evan Langdon
(74) Attorney, Agent, or Firm—Shinjyu Global IP Counselors, LLP

(57) ABSTRACT

A seat member of a reel unit of a spinning reel is fixed by means of a screw member to a cover portion of a lid member formed by die casting in a direction in which a body member and the lid member are separated from each other. The lid member is mounted to the body member to which various mechanisms have been mounted, and a cover member is mounted to the lower rear portion of the reel unit. Then, the cover member and the body member are fixedly coupled to each other by means of a screw member in a direction transverse to the direction in which the body member and the lid member are separated from each other, i.e., a direction transverse to the direction in which the body member and the lid member are extracted from the die.

14 Claims, 8 Drawing Sheets

REEL UNIT FOR SPINNING REEL

BACKGROUND OF THE INVENTION

1. Field of the Invention

This invention generally relates to a reel unit. More specifically, the present invention relates to a reel unit of a spinning reel capable of reeling out fishing line.

2. Background Information

A conventional spinning reel generally has a reel unit, a handle, and a spool. The reel unit is mounted on a fishing rod. The handle is rotatably attached to the reel unit. The spool is rotatably mounted to the reel unit, and is mounted on the front of a rotor such that it reciprocates on the reel body. Fishing line is wound around the outer circumference of the spool.

The reel unit is made of a rod attachment leg that is mounted on the fishing rod, and reel body that is unitarily formed with the rod attachment leg. A reel body has a body member having an accommodation space therein that opens to the side thereof, and the opening in the body member is covered by a lid member as shown in Japanese Laid-Open Patent Publication No. 2001-103897.

The body member or lid member that makes up this reel body are unitarily formed with the rod attachment leg by forming through die and injection-molding a synthetic resin or die-casting an aluminum alloy. Here, the direction in which the die cast products are extracted from the die is the same direction in which the body member and lid member are separated from each other.

In addition, a cover member is mounted on the rear and lower portions of the reel body in order to protect the reel unit. A screw member is used to screw the cover member to a mounting portion formed on the rear and lower portions of the reel unit from the rearward and downward directions. Thus, mounting occurs by means of the screw member of the cover member in a direction that is transverse to the direction in which the body member and the lid member are separated from each other, i.e., a direction transverse to the direction in which the body member and the lid member are extracted from the die. Thus, the mounting portion for the screw member must be processed further after the body member or the lid member are die cast.

In the aforementioned conventional reel units, the mounting portion used to mount the cover member is threaded in order to receive screws after the body member or the lid member is die cast. Thus, the formation of the mounting portion requires time and effort. In addition, it is comparatively difficult to form the screw portion in the body member of the lid member with a high decree of precision, thus increasing manufacturing costs to obtain this feature.

In view of the above, there exists a need for a reel unit for spinning reel that overcomes the above-mentioned problems in the prior art. This invention addresses this need in the prior art as well as other needs, which will become apparent to those skilled in the art from this disclosure.

SUMMARY OF THE INVENTION

An object of the present invention is to mount fixedly a cover member to a reel unit of a spinning reel with an inexpensive structure.

A reel unit of a spinning reel according to a first aspect of the present invention is a reel unit of a spinning reel mounted to a fishing rod and capable of paying out fishing line. The reel unit has a rod attachment leg, a reel body, a cover member, and a seat member. The rod attachment leg is mounted to the fishing rod. The reel body is connected to the rod attachment leg. The cover member is mounted from the rear such that it covers the reel body. The reel body includes a body member having an accommodation space that opens to a side thereof and a lid member that is detachably screwed to the body member such that the lid member covers the opening of the body member. Further, at least one of the body member and lid member is formed by die casting. The seat member is fixed to an inner peripheral surface of either the body member or the lid member formed by die casting. The seat member includes fixing means capable of attaching the cover member in a direction that is transverse to the direction in which the body member and the lid member are separated from each other.

The lid member is detachably screwed to the reel unit such that the lid member covers the opening of the body member. Here, a seat member is provided that includes a fixing means capable of attaching the cover member to the inner peripheral surface of either the body member or the lid member formed by die casting in a direction that is substantially transverse to the direction in which the body member and the lid member are separated from each other. Here, since the cover member fixing means is provided on the seat member, it is not necessary to provide a cover member fixing means on the body member or lid member formed by die casting. Due to this structure, if, for example, a threaded portion were to be provided as the fixing means, the body member or lid member would not have to be formed with a high degree of precision because it would not be necessary to form a threaded portion in the body member or lid member after the body member or the lid member is die cast. Thus, the cover member can be fixedly mounted to the reel unit utilizing a relatively inexpensive structure.

The reel unit according to a second aspect of the present invention is the reel unit according to the first aspect, in which the seat member is screwed to either the body member or the lid member in the direction in which the body member and the lid member are separated from each other. In this situation, the seat member can be easily fixed to the body member or the lid member. In addition, a screw mounting hole can be formed in the body member or the lid member at the same time the body member or lid member is die cast because the seat member is screwed in the direction in which the body member and lid member are separated from each other, i.e., the direction in which the body member and lid member are extracted from the die.

The reel unit according to a third aspect of the present invention is the reel unit of the first or second aspects of the present invention, in which the fixing means is a threaded portion in which a screw member is screwed therein. In this situation, the cover member can be easily and reliably fixed to the body member or the lid member.

The reel unit according to a fourth aspect of the present invention is the reel unit of any of the first to third aspects of the present invention, in which the rod attachment leg is unitarily formed with the body member. In this situation, since the rod attachment leg and the body member are unitarily formed, the structure of the lid member is simpler than when the lid member is unitarily formed with the rod attachment leg.

The reel unit according to a fifth aspect of the present invention is the reel unit of any of the first to third aspects of the present invention, in which the rod attachment leg is unitarily formed with the lid member. In this situation, since the rod attachment leg and the lid member are unitarily formed, the commingling of the thick portions and thin portions thereof is reduced and the body member is made relatively thin to increase and maintain the precision thereof. Further, the rod attachment leg is made relatively thick to maintain the strength thereof.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Figure 1:
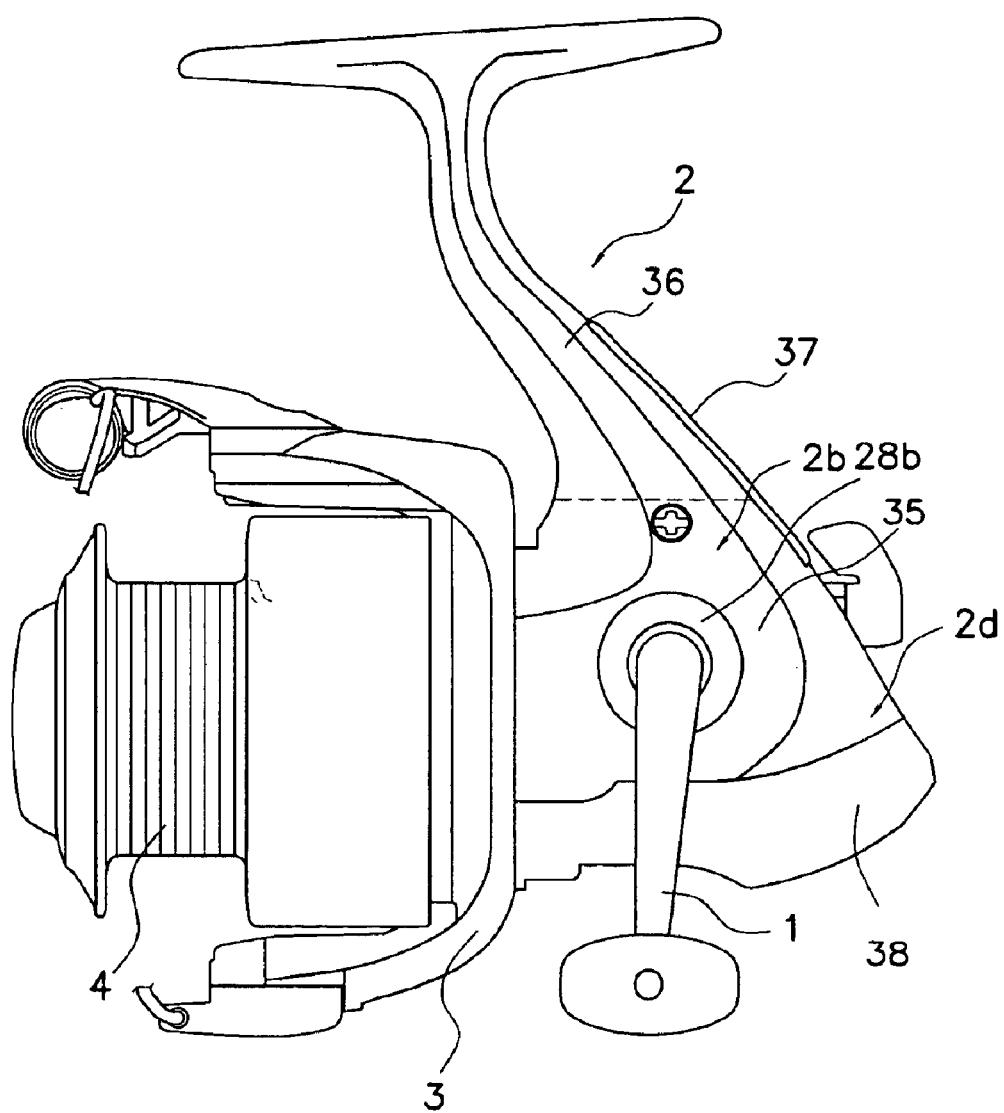
FIG. 1 is a lateral elevational view of a spinning reel in accordance with a preferred embodiment of the present invention.
Figure 2:
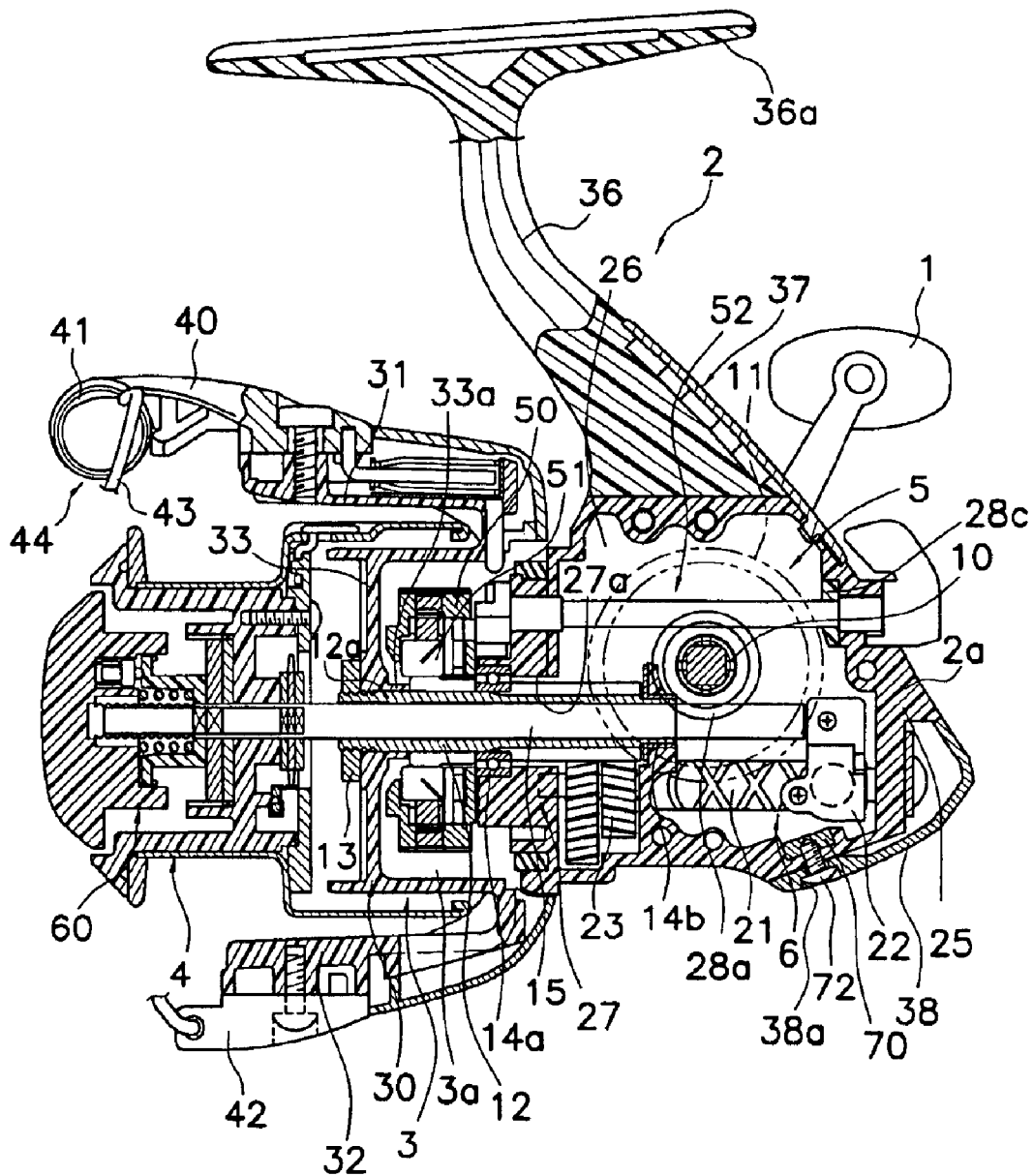
FIG. 2 is a lateral cross-sectional elevational view of the spinning reel of FIG. 1.

As shown in FIGS. 1 and 2, a spinning reel in accordance with a preferred embodiment of the present invention includes a reel unit 2, a rotor 3, and a spool 4. The reel unit 2 rotatably supports a handle 1 and is mounted to a fishing rod. The rotor 3 facilitates winding fishing line around the spool 4, and is rotatably supported to the front of the reel unit 2. The spool 4 has fishing line wound around an outer peripheral surface thereof, and is disposed on the front of the rotor 3 such that it can be reciprocated relative to the reel unit 2. It should be noted that the handle 1 can be attached to the left side of the reel unit 2 as shown in FIG. 1, or to the right side of the reel unit 2 as shown in FIG. 2.

As shown in FIGS. 1 to 5, the reel unit 2 principally includes a rod attachment leg 36, a cover member 38, and a reel body 2d having a body member 2a, a lid member 2b, and a circular flange portion 2c. The body member 2a supports the rotor 3 and the spool 4. The lid member 2b is detachably attached to the body member 2a. The lid member 2b can be detached from the body member 2a by pulling apart the body member 2a and the lid member 2b in a first direction (left-right direction in FIG. 3). Further, the circular flange portion 2c has a first and a second flange portion 24a and 24b respectively formed unitarily with the body member 2a and the lid member 2b.

Figure 3:
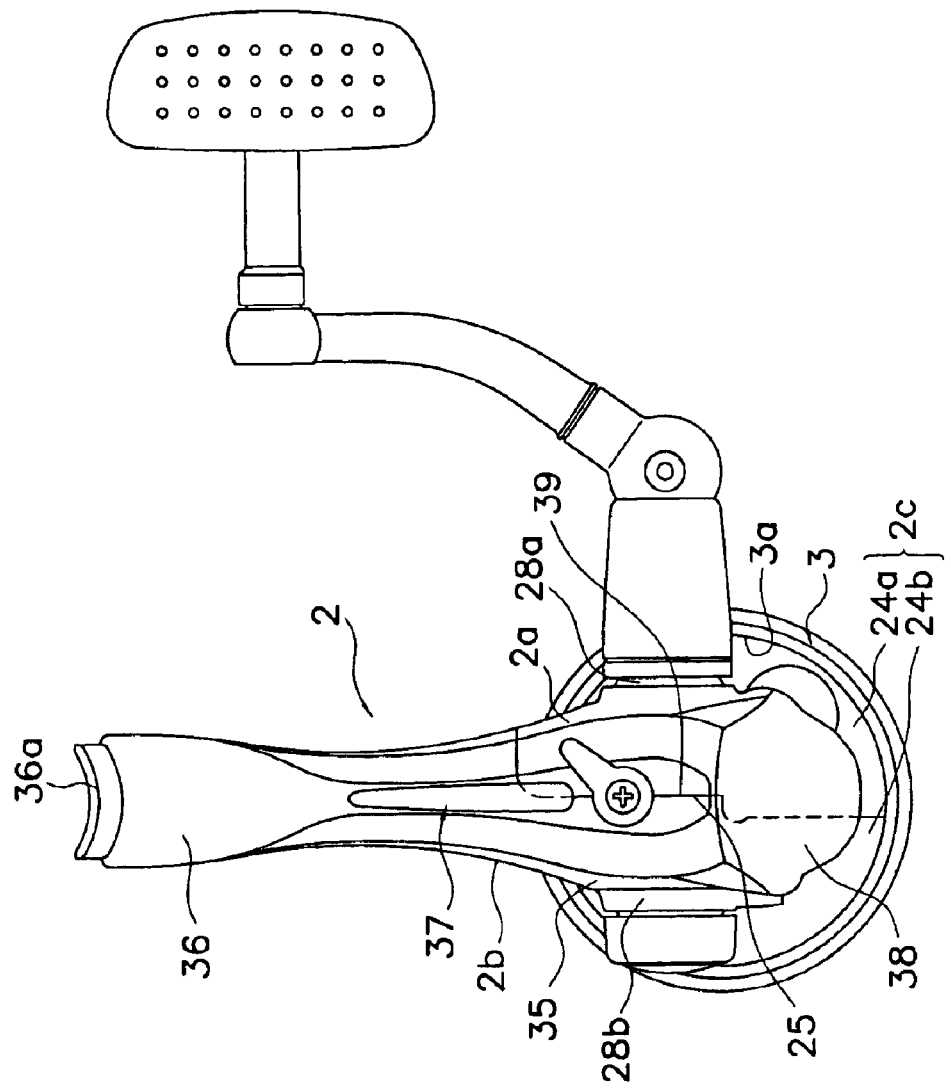
FIG. 3 is a rear elevational view of the spinning reel of FIG. 1.
Figure 4:
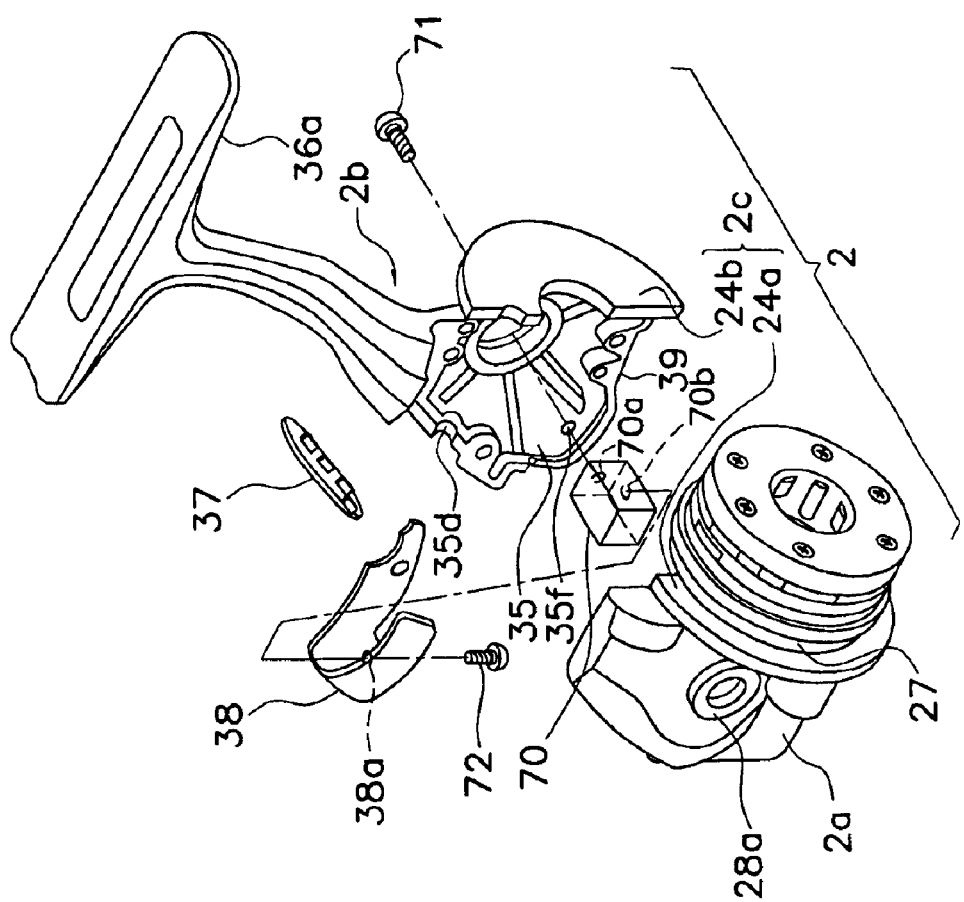
FIG. 4 is an exploded perspective view of the reel unit of FIG. 1.
Figure 5:
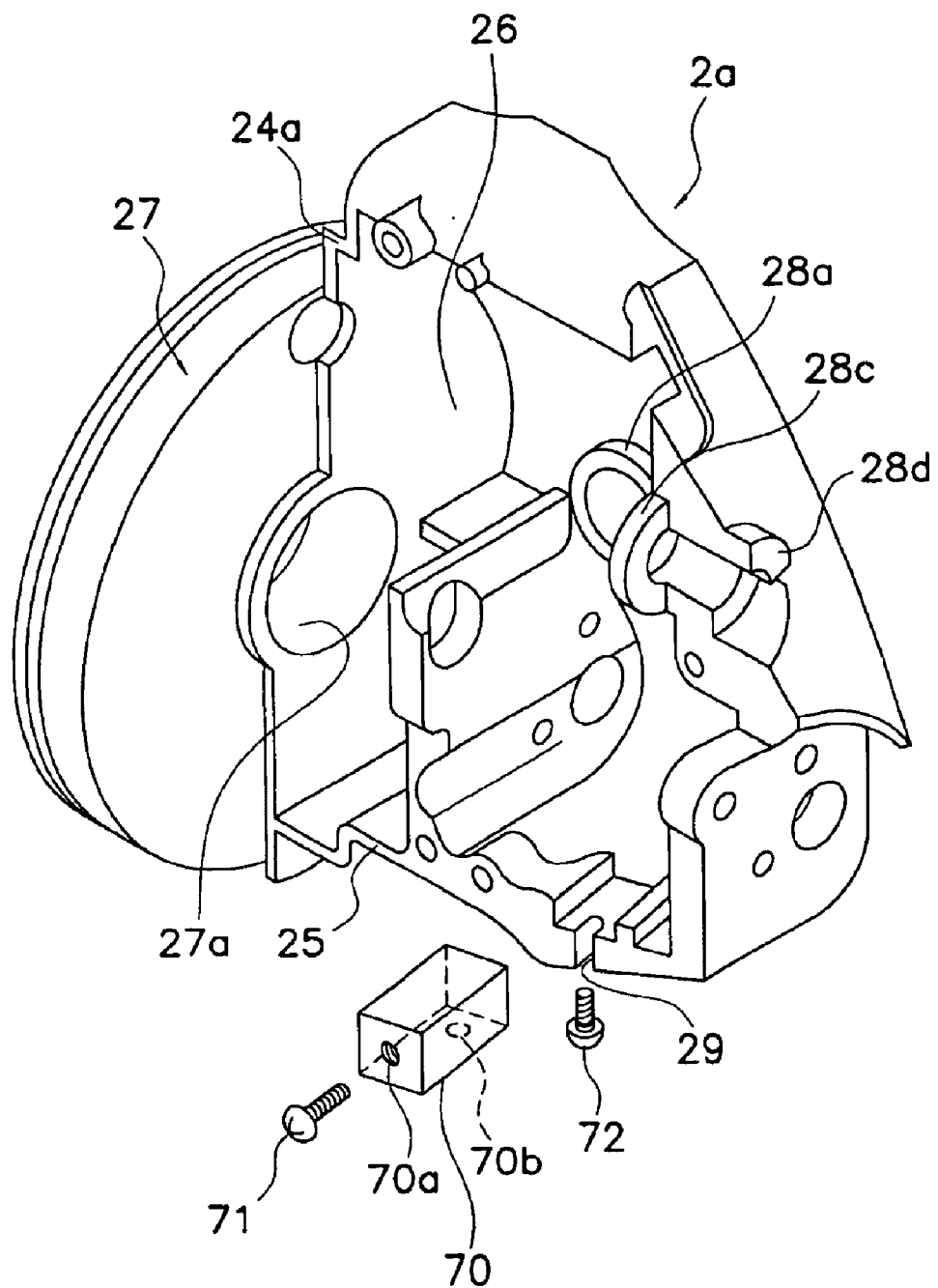
FIG. 5 is an oblique perspective view of a lid member of the reel unit of FIG. 1.
Figure 7:
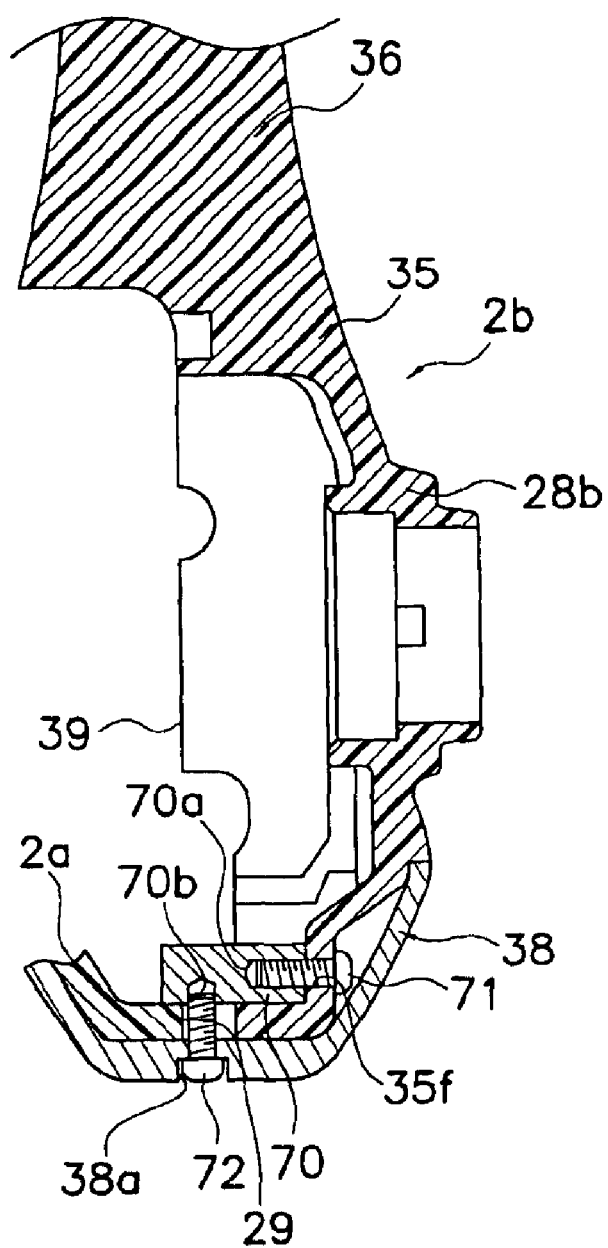
FIG. 7 is a cross-sectional view taken along line VII—VII of FIG. 6.

As shown in FIGS. 3 to 5, the body member 2a has an opening 25, a mechanism accommodation space 26, a rotation support portion 27, and a first handle support portion 28a. The opening 25 is formed in a side portion of the body member 2a. The mechanism accommodation space 26 is formed inside the body member 2a. The rotation support portion 27 is disposed inside a circular hollow 3a formed in the reel unit 2 side of the rotor 3, and serves to support rotatably the rotation shaft (pinion gear 12 described below) of the rotor 3. The first handle support portion 28a includes a boss portion to support one end of a handle shaft 10 that is the rotation shaft of the handle 1. In addition, as shown in FIGS. 5 and 7, a U-shaped groove 29 that opens to the side of the body member 2a and connects the inside and the outside of the body member 2a is formed on the lower portion of the body member 2a.

The opening 25 is provided in three portions or the body member 2a with the exception of the front portion, that is, the upper, the lower, and the rear portions, and serves to mount various mechanisms in the mechanism accommodating space 26. As shown in FIG. 2, the mechanism accommodating space 26 accommodates a rotor driving mechanism 5 to rotate the rotor 3, and a reciprocating mechanism 6 that uniformly winds up the fishing line by reciprocating the spool 4 relative to the reel unit 2. The rotation support portion 27 has a substantially columnar shape and is formed unitarily with the semi-circular first flange portion 24a, which is also formed unitarily with the front of the mechanism accommodating space 26. The rotation support portion 27 has a through hole 27a through the center of which the pinion gear 12 passes. A one-way clutch 51 of the reverse rotation prevention mechanism 50 (described below) is screwed fast on the front face of the rotation support portion 27.

As shown in FIGS. 2 and 5, a pivot support portion 28c is formed at the rear of the body member 2a in order to support an operation shaft of an operation mechanism 52 of the reverse rotation prevention mechanism 50. The pivot support portion 28c is formed in a semi-circular shape protruding toward the lid member 2b. The pivot support portion 28c is arranged in a space 35d formed inside of a trimmed portion 39 of the lid member 2b. A protruding quarter-circle boss portion 28d is formed at the rear of the body member 2a.

Referring to FIG. 4, the lid member 2b is preferably made of, for example, a polyamide-based synthetic resin reinforced by glass fibers, and is formed by forming a die and performing injection molding or the like. As shown in FIGS. 3, 4, 6, and 7, the lid member 2b has a thin-walled cover portion 35. The cover portion 35 is formed unitarily with the second flange portion 24b serving as a wall portion at the side to which the rotor 3 is mounted so that the cover portion 35 covers the opening 25 of the body member 2a and forms a space in the interior thereof. The rod attachment leg 36 unitarily extends upwardly from the cover portion 35. In the upper portion and the rear portion of the cover portion 35, excepting the front portion thereof, a trimmed portion 39 is formed encompassing the opening 25. In the trimmed portion 39, a step is formed so that it is close to the opening 25. A substantially semi-circular second flange portion 24b of the flange portion 2c is formed on the front of the cover portion 35. An inner side portion of the second flange portion 24b that protrudes inward serves as a wall portion to reinforce the cover portion 35. A second handle support portion 28b having a boss portion for supporting the other end of the handle shaft 10 is formed on one side of the cover portion 35.

Figure 6:
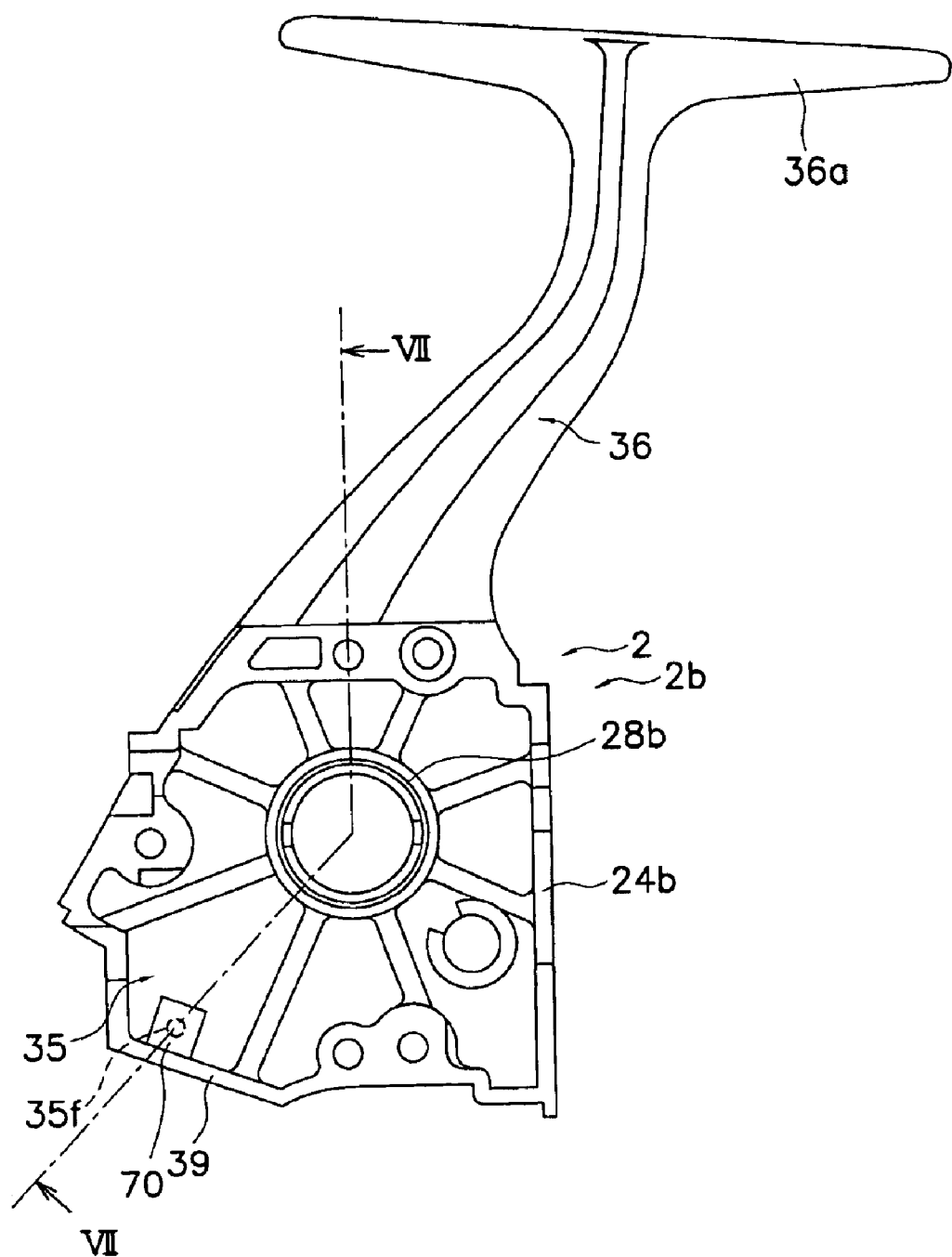
FIG. 6 is a lateral elevational view of the lid member.

As shown in FIGS. 4, 6, and 7, a seat member 70 is provided to attach to a cover member 38 (described below). The seat member 70 is mounted on an inner peripheral surface of the cover portion 35 in the direction in which the body member 2a and the lid member 2b are separated. The seat member 70 includes a threaded portion 70a (a first-direction threaded portion) that is formed extending in the first direction, in which the body member 2a and the lid member 2b are separated (horizontal direction), and a threaded portion 70b (a second-direction threaded portion) that is formed extending in a second direction (vertical direction) that is transverse to the first direction in which the threaded portion 70a extends. A through hole 35f is formed in the lower rear portion of the cover portion 35. The seat member 70 is fixedly coupled to the cover portion 35 by inserting a screw member 71 (a first-direction screw member) into the through hole 35f from the outer peripheral side of the cover portion 35 and screwing it into the threaded portion 70a. The seat member 70 is also coupled to the cover member 38 by inserting a screw member 72 (a second-direction screw member) into the threaded portion 70b from over the cover member 38, as shown in FIG. 2. In this embodiment, the threaded portion 70b and the screw member 72 function as the fixing means. Although the seat member 70 has a cubic shape in this embodiment, the shape of the seat member 70 is not limited thereby.

The rod attachment leg 36 is a solid, relatively, thick-walled member, one end of which extends both forward and backward and forms a fishing rod mounting portion 36a. A boundary portion between the cover portion 35 and the rod attachment leg 36 is cut out at approximately half the thickness thereof, so that the upper portion of the body member 2a is inserted into the cut-out portion thus allowing the outer side faces to be smoothly connected.

Referring now to FIGS. 3 and 4, the flange portion 2c is formed into a disk-like shape and arranged in substantially the same plane as the edge face of the circular hollow 3a formed in the rear of the rotor 3, thus covering the circular hollow 3a. As noted above, the flange portion 2c includes the substantially semi-circular first flange portion 24a unitarily formed with the body member 2a, and the semicircular second flange portion 24b, which is unitarily formed with the cover portion 35 of the lid member 2b and forms a circular or disk portion together with the first flange portion 24a.

A name plate 37 is fixedly coupled to the rear surface of the rod attachment leg 36 of the reel unit 2. In addition, a cover member 38 is mounted on the lower ridge surface of the reel unit 2 such that it covers the reel unit 2 from the rear thereof.

The cover member 38 is, for example, preferably made of a synthetic resin, such as ABS resin, that is plated with a metal, or made of a stainless steel alloy so that it cannot be easily damaged, and serves to protect the portion of the reel unit 2 that is most susceptible to damage. As shown in FIGS. 2, 4, and 7, a stepped through hole 38a is formed in the lower portion of the cover member 38 in a direction that is transverse to the direction in which the body member 2a and the lid member 2b can be separated. The cover member 38 is fixed to the body member 2a by passing the screw member 72 inserted into the through hole 38a from the outer peripheral side of the cover member 38 into the groove 29 of the body member 2a, and then screwing it into the threaded portion 70b formed in the seat member 70 fixedly coupled to the cover portion 35.

As shown in FIG. 2, the rotor driving mechanism 5 includes a handle shaft 10, a master gear 11 made of a face gear, and a pinion gear 12. The master gear 11 rotates together with the handle shaft 10, to which the handle 1 is fixedly coupled. The pinion gear 12 meshes with the master gear 11. The pinion gear 12 is tubular, and serves as the rotation shaft of the rotor 3. Its front portion 12a penetrates the center of the rotor 3, and is fixed with a nut 13 to the rotor 3. The pinion gear 12 is rotatably supported by the reel unit 2 at its mid-portion and rear end respectively by a bearing 14a mounted to the rotation support portion 27 and a bearing 14b arranged further rearward. Since the structure and function of rotor driving mechanism are well known among the ordinarily skilled in the art, they will not be described or illustrated in detail herein.

The reciprocating mechanism 6 is a mechanism provided to reciprocate the spool 4 relative to the reel unit 2 by reciprocating the spool shaft 15. The reciprocating mechanism 6 is linked to the central portion of the spool 4 with the drag mechanism 60 interposed therebetween. The reciprocating mechanism 6 has a worm 21 disposed below and parallel to the spool shaft 15, a slider 22 that moves back and forth along the worm 21, and an intermediate gear 23 affixed to the front end of the worm 21. The rear end of the spool shaft 15 is non-rotatably affixed to the slider 22. The intermediate gear 23 meshes with the pinion gear 12 via a gear-down train (not shown in the figures). Thus, the speed with which the reciprocating mechanism 6 reciprocates relative to the reel unit 2 is slowed down, and the fishing line can be packed densely onto the spool 4. Since the structure and function of reciprocating mechanism are well known among the ordinarily skilled in the art, they will not be described or illustrated in detail herein.

The first and the second handle support portions 28a and 28b are cylindrical portions that are provided in the body member 2a and in which a bearing (not shown in the figures) is mounted. Since the structure and function of bearings are well known among the ordinarily skilled in the art, they will not be described or illustrated in detail herein.

As shown in FIG. 2, the rotor 3 includes a cylindrical portion 30, and a first rotor arm 31 and a second rotor arm 32 arranged opposite to each other on the sides of the cylindrical portion 30. The cylindrical portion 30 and the rotor arms 31 and 32 are unitarily formed.

A front wall 33 is formed at the front part of the cylindrical portion 30, and a boss 33a is formed in the center of the front wall 33. The spool shaft 15 and the front part 12a of the pinion gear 12 pass through a hole in this boss 33a. A nut 13 is disposed on the front side of the front wall 33, and this nut 13 is threaded onto the threaded portion at the distal end of the pinion gear 12. In the cylindrical portion 30, the portion rearward from the front wall 33 is the hollow 3a, and the flange portion 2c is formed unitarily with the body member 2a and the lid member 2b and flush with the rear end face of the hollow 3a. Since the structure and function of rotor are well known among the ordinarily skilled in the art, they will not be described or illustrated in further detail herein.

A first bail-support member 40 is pivotably mounted onto the outer peripheral side of the front end of the first rotor arm 31. A line roller 41 for guiding fishing line onto the spool 4 is mounted to the front end of the first bail-support member 40. A second bail-support member 42 is pivotably mounted onto the outer peripheral side of the front end of the second rotor arm 32. A bail 43 is provided between the line roller 41 at the front end of the first bail-support member 40 and the second bail-support member 42. These first and second bail-support members 40 and 42, the line roller 41, and the bail 43 together form a bail arm 44. Since the structure and function of bail arm are well known among the ordinarily skilled in the art, they will not be described or illustrated in further detail herein.

A reverse rotation prevention mechanism 50 for the rotor 3 is disposed inside the cylindrical portion 30 of the rotor 3. The reverse rotation prevention mechanism 50 has a roller-type one-way clutch 51 and a control mechanism 52 to switch the one-way clutch 51 between an operating state and a non-operating state. Since the structure and function of reverse check mechanism are well known among the ordinarily skilled in the art, they will not be described or illustrated in further detail herein.

The spool 4 is disposed between the first rotor arm 31 and second rotor arm 32 of the rotor 3, and is mounted to the tip of the spool shaft 15 with a drag mechanism 60 interposed therebetween. Since the structure and function of spool are well known among the ordinarily skilled in the art, they will not be described or illustrated in further detail herein.

With a spinning reel constructed in this manner, as shown in FIGS. 4 and 7, the reel unit 2 is assembled by fixedly attaching the seat member 70 to the cover portion 35 by the screw member 71 in the direction in which the body member 2a and the lid member 2b are separated. In this state, the lid member 2b is mounted to a body member 2a having various mechanisms mounted thereto. The cover member 38 is mounted on the lower rear surface of the reel unit 2. Then, the cover member 38 and the body member 2a are fixedly coupled to each other by the screw member 72 in a direction transverse to the direction in which the body member 2a and the lid member 2b are separated from each other.

With this type of spinning reel, a seat member 70 that can attach the cover member 38 in a direction that is transverse to the direction in which the body member 2a and the lid member 2b are separated from each other, i.e., the direction that is transverse to the direction in which the body member 2a and the lid member 2b are pulled out of the die, is mounted to the inner peripheral surface of a lid member 2b, which is formed by die casting. Here, it is not necessary to provide a threaded portion 70b for fixedly coupling the cover member 38 on or in the lid member 2b because a threaded portion 70b is provided for fixing the cover member 38 to the seat member 70. Due to this structure, the lid member 2b does not need to be formed with a high degree of precision because it will not be necessary to form a threaded portion in the lid member 2b after the lid member 2b is die cast. Thus, the cover member 38 can be fixedly mounted to the reel unit 2 with an inexpensive structure.

OTHER EMBODIMENTS

Alternate embodiments will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

(a) The types of spinning reels are not limited to the foregoing embodiment. The present invention can be suitably applied to spinning reels having a drag mechanism, or to spinning reels to which a braking mechanism having a brake lever is mounted instead of a reverse rotation prevention mechanism.

(b) The shapes of the rod attachment leg and the cover portion are not limited to those of the foregoing embodiment.

(c) In the foregoing embodiment, the first flange portion 24b or the second flange portion 24b are formed unitarily with the body member 2a and the cover portion 35, but other portions may be formed separately so long as only the wall portion (the portion of the second flange portion 24b that protrudes inward) is formed unitarily with the cover portion 35.

(d) In the foregoing embodiment, the seat member 70 is mounted to the lid member 2b, but the seat member 70 may be mounted to a body member 2a, which is formed by die casting.

(e) Although the rod attachment leg 36 in the aforementioned embodiment is formed integrally with the lid member 2b, the rod attachment leg 36 may instead be formed integrally with the body member 2a.

Figure 8:
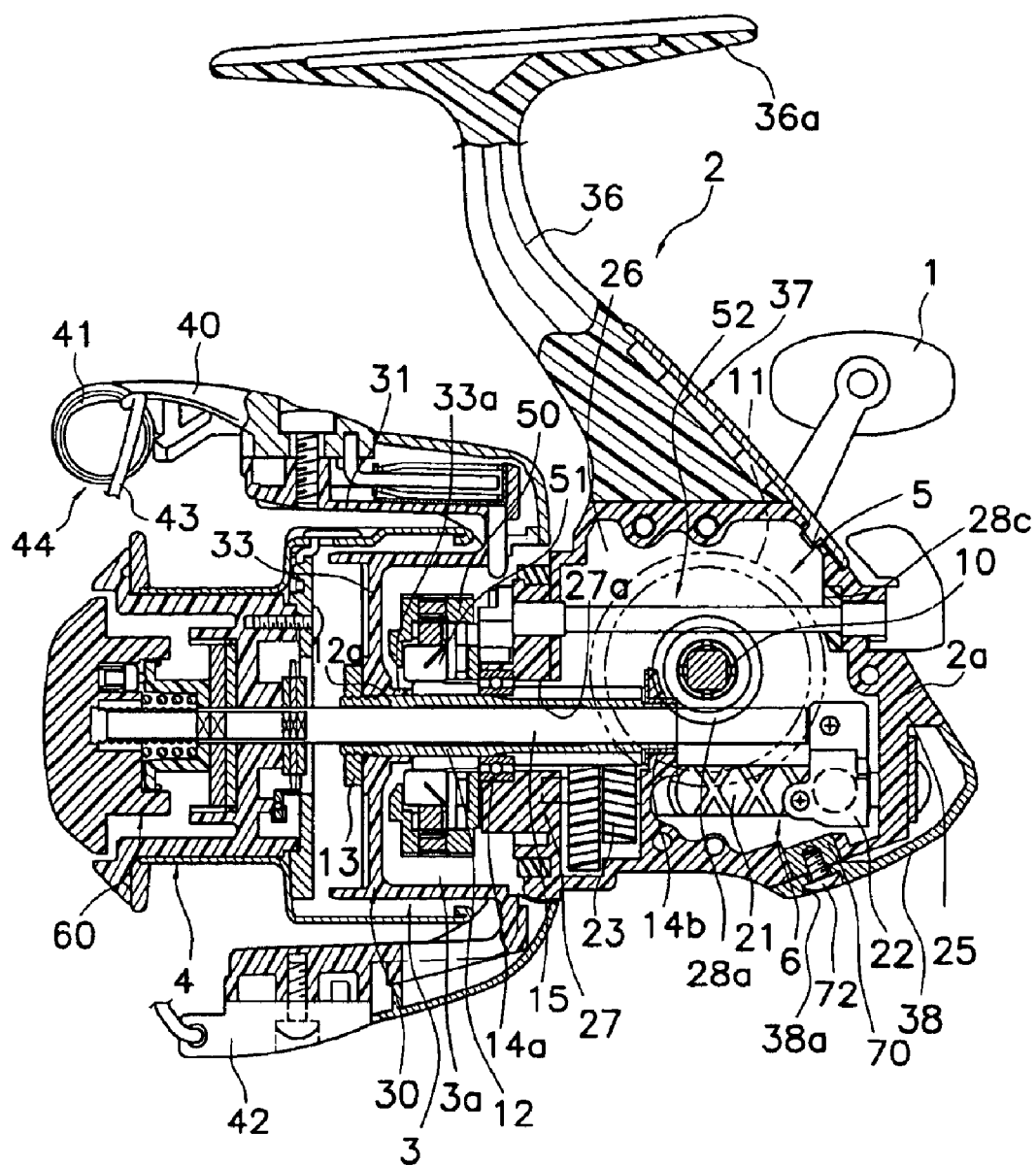
FIG. 8 is a view corresponding to FIG. 2 in accordance with an alternate preferred embodiment of the present invention.

(f) In the foregoing embodiment, the screw member 72 passes through the cover member 38 and into the groove 29 of the body member 2a, but as shown in FIG. 8, an opening may be provided in the body member 2a and the cover member 38 may be directly attached to the seat member 70.

According to the present invention, a cover member can be fixedly mounted to the reel unit of a spinning reel with an inexpensive structure because a seat member is provided which has a fixing means that can attach the cover member to the inner circumferential surface of a body member or a lid member formed by die casting in a direction transverse to the direction in which the body member and the lid member are pulled apart.

"Means plus function" clauses as utilized in the specification and claims should include any structure or hardware and/or algorithm or software that can be utilized to carry out the function of the "means plus function" clause.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

The terms of degree such as "substantially," "about," and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2002-311547. The entire disclosure of Japanese Patent Application No. 2002-311547 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A spinning reel reel unit comprising:

a rod attachment leg portion being mountable to a fishing rod;

a reel body having a body member having an accommodation space opening to a side thereof and a lid member being detachably attached to said body member to cover said accommodation space of said body member, said lid member being detachable from said body member by pulling apart said body member and said lid member in a first direction, at least one of said body member and said lid member being formed by die casting, at least one of said body member and said lid member being formed as one-piece unitary member with said rod attachment leg portion;

a cover member being mounted from a rear of said reel body to cover said reel body; and a seat member being fixedly attached to an inner peripheral surface of one of said body member and said lid member, said seat member having fixing means for fixedly coupling with said cover member in a second direction that is transverse to the first directions, said seat member being fixedly coupled to one of said body member and said lid member with a first-direction screw member that extends in the first direction.

2. The spinning reel reel unit according to claim 1, wherein said fixing means includes a second-direction threaded portion formed on said seat member and extending in the second direction, and a second-direction screw member that is screwed in said second-direction threaded portion.

3. The spinning reel reel unit according to claim 1, wherein said rod attachment leg portion is formed as a one-piece unitary member with said lid member.

4. The spinning reel reel unit according to claim 2, wherein said seat member includes a first-direction threaded portion extending in the first direction, such that said first-direction screw member is screwed in said first-direction threaded portion.

5. The spinning reel reel unit according to claim 4, wherein said seat member is fixedly attached to the inner periphery of said lid member.

6. The spinning reel reel unit according to claim 1, wherein said cover member and said seat member interpose said body member.

7. The spinning reel reel unit according to claim 1, wherein said cover member contacts said seat member.

8. A spinning reel adapted to be mounted to a fishing rod, said spinning reel comprising:

a handle;

a reel unit that rotatably supports said handle, said reel unit having a rod attachment leg portion being mountable to the fishing rod, a reel body having a body member having an accommodation space opening to a side thereof and a lid member being detachably attached to said body member to cover said accommodation space of said body member, said lid member being detachable from said body member by pulling apart said body member and said lid member in a first direction, at least one of said body member and said lid member being formed by die casting, at least one of said body member and said lid member being formed as one-piece unitary member with said rod attachment leg portion, a cover member being mounted from a rear of said reel body to cover said reel body, and a seat member being fixedly attached to an inner peripheral surface of one of said body member and said lid member, said cover member being attached to said seat member in a second direction that is transverse to the first direction, a rotor rotatably supported to a front of said reel unit; and a spool disposed on a front of said rotor so as to be reciprocated relative to said reel unit, said seat member being fixedly coupled to one of said body member and said lid member with a first-direction screw member that extends in the first direction.

9. The spinning reel according to claim 8, wherein said seat member includes a second-direction threaded portion formed on said seat member and extending in the second direction, and a second-direction screw member that is screwed in said second-direction threaded portion.

10. The spinning reel according to claim 8, wherein said rod attachment leg portion is formed as a one-piece unitary member with said lid member.

11. The spinning reel according to claim 9, wherein said seat member includes a first-direction threaded portion extending in the first direction, such that said first-direction screw member is screwed in said first-direction threaded portion.

12. The spinning reel according to claim 11, wherein said seat member is fixedly attached to the inner periphery of said lid member.

13. The spinning reel according to claim 8, wherein said cover member and said seat member interpose said body member.

14. The spinning reel according to claim 8, wherein said cover member contacts said seat member.

* * * * *